(12) United States Patent
Trumper et al.

(10) Patent No.: US 7,603,696 B2
(45) Date of Patent: Oct. 13, 2009

(54) HYBRID DISTRIBUTED FIREWALL APPARATUS, SYSTEMS, AND METHODS

(75) Inventors: Fabian Trumper, Modiin (IL); Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 11/150,539

(22) Filed: Jun. 10, 2005

(65) Prior Publication Data

US 2006/0282887 A1 Dec. 14, 2006

(51) Int. Cl.
*G06F 17/00* (2006.01)
(52) U.S. Cl. .......................................................... 726/1
(58) Field of Classification Search ...................... 726/1, 726/11, 23; 713/153, 188; 709/238
See application file for complete search history.

(56) References Cited

U.S. PATENT DOCUMENTS

| 6,678,827 B1 * | 1/2004 | Rothermel et al. ............. 726/6 |
| 2004/0181689 A1 * | 9/2004 | Kiyoto et al. ................ 713/201 |
| 2006/0075472 A1 * | 4/2006 | Sanda et al. ................... 726/3 |

\* cited by examiner

*Primary Examiner*—Emmanuel L Moise
*Assistant Examiner*—Ali S Abyaneh
(74) *Attorney, Agent, or Firm*—Blakely, Sokoloff, Taylor & Zafman LLP

(57) ABSTRACT

Apparatus and systems, as well as methods and articles, may operate to control a security state associated with one or more network node(s) using a master heuristic policy enforcement module associated with a network firewall, and to selectively re-direct first packets to the network firewall from a remotely manageable network controller located within the network node(s) based upon the security state.

17 Claims, 3 Drawing Sheets

HYBRID DISTRIBUTED FIREWALL APPARATUS, SYSTEMS, AND METHODS

TECHNICAL FIELD

Various embodiments described herein relate to network security generally, including apparatus, systems, and methods used to control a network node security state.

BACKGROUND INFORMATION

Common state-of-the-art firewall applications may be traditionally based on two rivaling designs. One is a classical, centralized architecture with the firewall application hosted on strategically located gateways. The other is a distributed architecture with the firewall application deployed on individual network hosts. Both architectures may have shortcomings.

The classical architecture divides the network into an inner perimeter and an outer perimeter, and the firewall lies between as a gateway. This topology may act to direct traffic between a node within the inner perimeter and a node on the outer perimeter through the firewall. However, the classical firewall may be blind to traffic passing between two nodes within the inner perimeter. The classical firewall may thus fail to protect network nodes from threats coming from within the inner perimeter. Once a host in the inner perimeter is compromised, other inner perimeter network nodes may be vulnerable to attacks.

To overcome the above limitations, personal firewall architecture has emerged. In this end-node architecture, the firewall application may be replicated throughout the network on all end nodes. An end-node may execute a firewall application to monitor and filter inbound and outbound traffic to and from the end-node. This design may protect against attacks originating from within the inner perimeter as well as from the outer perimeter. The network may be less vulnerable to the spread of mal-ware from peer nodes as a result. However each disparate node may require separate management. Thus, for example, information technology staff may be required to distribute new virus signatures across all network nodes, rather than merely to a centralized node. And, the replication of the firewall application on all nodes may represent a less efficient use of processing resources than with a centralized approach.

DETAILED DESCRIPTION

Figure 1:
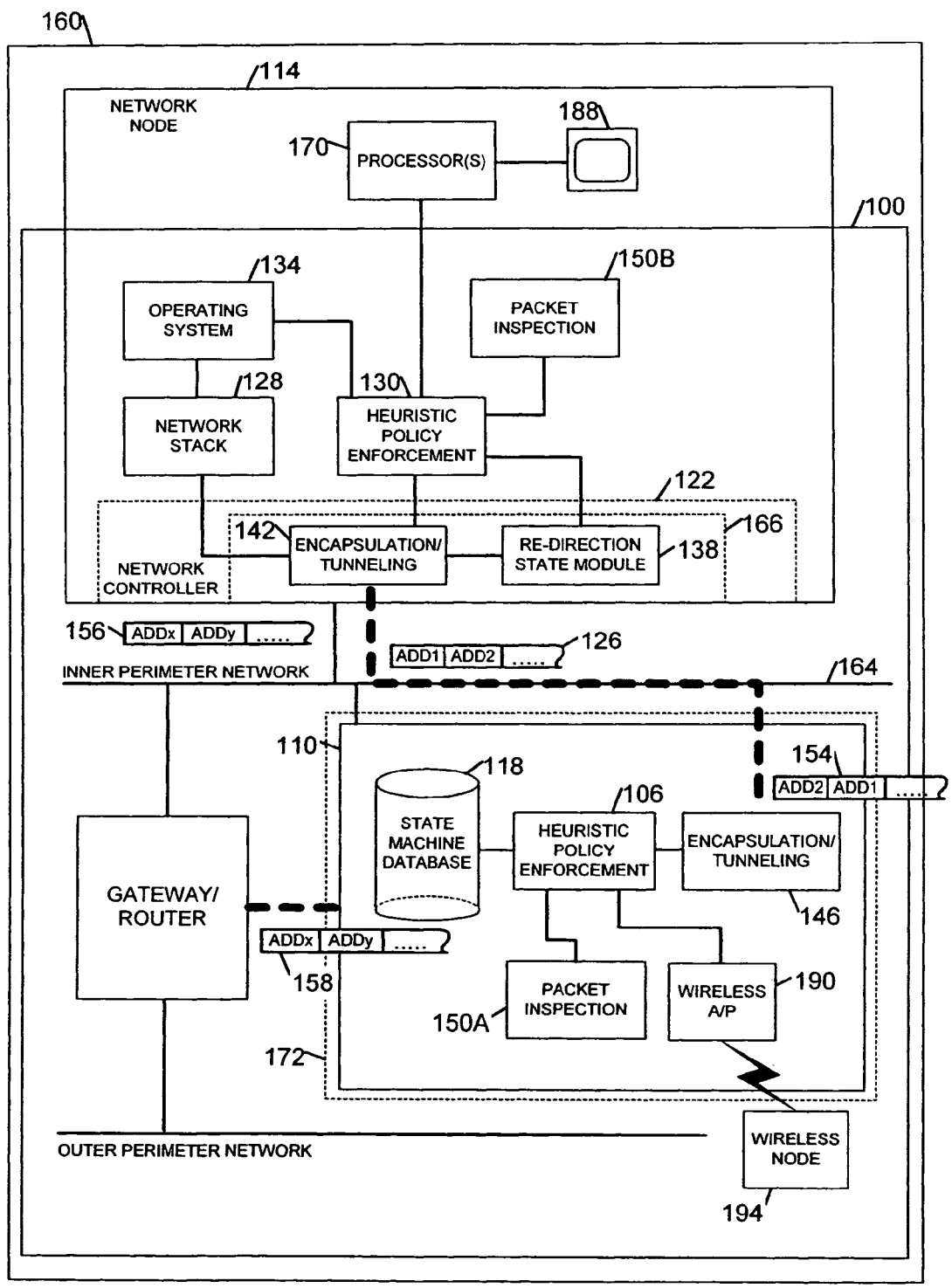
FIG. 1 is a block diagram of an apparatus and a representative system according to various embodiments of the invention.

FIG. 1 comprises a block diagram of apparatus 100, 160 and a system 180 according to various embodiments of the invention. Some embodiments may describe a hybrid, distributed firewall architecture with both centralized and end-node firewall functionality. An end-node may also be referred to herein as "host," "end-node host," and "network node 114." A processor or processor(s) may be referred to as "host processor(s)." Components required to implement embodiments of the invention may include a remotely manageable network controller 122 at the end node with a network interface and a built in re-routing function, also referred to as an "active" network controller. Other components may include a policy-based security management function to control and supervise the re-routing function, a host-based firewall application, and an operating system and application patch level configuration and monitoring function. Additional components may include a centralized firewall application running on a network gateway, a security policy enforcement function with encapsulation and re-routing capability, and a state machine per host.

The components may be combined to create a hub-and-spoke firewall application. Traffic may be tunneled from the end nodes to the centralized firewall application. The latter may forward outgoing and incoming traffic to the end-node host while monitoring the traffic for any malicious or abnormal activities.

An end-node host may maintain a state machine to track its security state. The state machine may comprise a binary state machine capable of existing in a secure or insecure state. The centralized firewall application may also maintain a state machine per end-node host. Each state may include an associated policy to describe actions to be taken when switching from one state to another. The policy may dictate whether the traffic to or from the end-node host is to be re-routed through the centralized firewall for a more in-depth inspection. The network security policies implemented by the centralized firewall may include techniques to address a particular security threat level of a host.

In a state of "secure," the host may be considered as trusted and all incoming and outgoing traffic may then flow through the network gateway uninspected. In a state of "insecure," the host may be considered vulnerable and a potential threat, and traffic incoming to and outgoing from the host may be redirected through the centralized firewall gateway. The gateway may also be referred to herein as a "central firewall node," a "centralized firewall," and a "network firewall 110."

By default, hosts may be considered non-secure and may start in the insecure state. In this state, traffic targeted to peer hosts on the same network or on another network may be re-routed through the centralized firewall node and monitored for any malicious or abnormal activities. Firewall functionality in this state may be similar to the classical centralized network-based firewall, except that the re-routing may be accomplished by an active network controller within the host system, without relying on a network stack configuration in the host.

A variety of heuristics may be implemented to trigger a transition from a state of insecure to a state of secure. The operating system and application security patch level monitoring function may, for example, determine whether the operating system is at an appropriate patch level as determined by a network administrator. Other heuristics may include host specific, administrator defined policies, and whether any security issues have been seen with traffic associated with the host for a specified period of time.

When the centralized firewall has deemed a specific host as secure based on the pre-defined network security heuristics, it will instruct the security management (policy enforcement) function to change the host security state to the state of secure. At the host side, switching to a "secure mode" state may trigger a policy change including, for example, a command to cease re-routing outgoing traffic through the centralized firewall. The policy change may also include a more sophisticated approach, including a command to re-route only new sessions.

Heuristics used to trigger a transition from the state of secure to the state of insecure may include operating system and application security patch level monitoring, as described above. Specified minimum patch levels as determined by the network administrator or based upon known vulnerabilities of installed operating systems and application versions may be enforced.

Other heuristics may include a local network security containment state (breached/non-breached) and random selection. A host security state may be reverted to a state of insecure on a random basis for a periodic, in-depth traffic inspection. Since an attack may spread quickly on a local network, observing abnormal behavior from a randomly-selected host may imply that other hosts in the affected network segment may be under threat and may thus require containment.

Mechanisms of communication between the centralized firewall and the active network controller at the host may be implemented in many ways, and may share certain properties. The network controller and the central firewall may operate to authenticate messages from each other via secure protocols including a transport layer security protocol (TLS), for example. Secure socket layer protocols such as TLS may protect messages from interception or modification by parties other than the message originator. Security may be enhanced by requiring that control traffic be terminated at the active network controller level and not passed up the host network stack.

In some embodiments, the apparatus 100 may include a master heuristic policy enforcement module 106 associated with a network firewall 10 to control a security state associated with one or more network node(s) 114. The apparatus 100 may also include a state machine database 118 coupled to the master heuristic policy enforcement module 106 to store the security state associated with the network node(s) 114.

The apparatus 100 may further include a remotely manageable network controller 122 located within the network node(s) 114. The remotely manageable network controller 122 may be capable of re-directing first packets 126 without intervention by a network stack 128 associated with an operating system 134 executing on the network node(s) 114. The network controller 122 may communicatively couple to the master heuristic policy enforcement module 106 to selectively re-direct the first packets 126 to the network firewall 110.

The apparatus 100 may include a slave heuristic policy enforcement module 130 coupled to the remotely manageable network controller 122 to control the security state associated with the network node(s) 114. The slave module 130 may respond to the master heuristic policy enforcement module 106 previously described, or may initiate state transitions without intervention from the master heuristic policy enforcement module 106. The apparatus 100 may also include a re-direction state module 138 associated with the network controller 122 to couple to the master heuristic policy enforcement module 106 and to the slave heuristic policy enforcement module 130 to enable the re-direction.

The apparatus 100 may further include a slave tunneling module 142 coupled to the re-direction state module 138 to encapsulate the first packets 126 for re-direction to the network firewall 110. A decision to re-direct the first packets 126 may be made by the master heuristic policy enforcement module 106, the slave heuristic policy enforcement module 130, or both. The apparatus 100 may also include a master tunneling module 146 coupled to the master heuristic policy enforcement module 106 to de-encapsulate and perhaps to re-route the first packets 126 received from the network node(s) 114.

The apparatus 100 may further include a packet inspection module 150A coupled to the master heuristic policy enforcement module 106 to inspect the first packets 126 as received at the network firewall 110 from the network node(s) 114. The packet inspection module 150A may also inspect second packets 154 to be forwarded to the network node(s) 114 and third packets 158 received at the network firewall 110. The apparatus 100 may further include a packet inspection module 150B coupled to the slave heuristic policy enforcement module 130 to inspect fourth packets 156 incoming to or outgoing from the one or more network node(s) 114.

In another embodiment, an apparatus 160 may include an active network controller 122 attached between a network 164 and one or more network node(s) 114. The controller 122 may be operable for controlling a network interface 166 having a re-routing function. A policy-based security management function may control and supervise the re-routing function. The security management function may be performed by and distributed between a master heuristic policy enforcement module 106 and a slave heuristic policy enforcement module 130.

The apparatus 160 may also include one or more host processor(s) 170 at the network node(s) 114. The processor(s) 170 may run an operating system 134, an application patch function, a configuration monitoring function, and/or a local firewall function, among others.

The apparatus 160 may also include a centralized network server 172 connected to the network 164. The network server 172 may run a centralized firewall operable to enforce security, including encapsulating and re-routing packets between the server 172 and the network node(s) 114. Security enforcement may also include maintaining a state machine for each one of the network node(s) 114, and perhaps storing associated states in a state machine database 118.

The apparatus 160 may further include a slave tunneling module 142 to couple to the centralized network server 172 to encapsulate the packets for re-routing to the centralized network server 172. A re-direction state module 138 coupled to the slave tunneling module 142 may operate to enable the re-routing function.

In another embodiment, a system 180 may comprise one or more of apparatus 100, 160, including a master heuristic policy enforcement module 106 to control a security state associated with one or more network node(s) 114, as previously described. The security state may comprise a state of secure, insecure, or both; and the security state of insecure may require a re-direction of first packets 126 to a network firewall 110. The master heuristic policy enforcement module 106 may change the security state from secure to insecure to randomly inspect the first packets 126.

The system 180 may also include one or more processor(s) 170 coupled to the slave heuristic policy enforcement module 130, and a display 188 coupled to the processor(s) 170 to display data associated with the system 180. The display 188 may comprise a cathode ray tube display or a solid-state display such as a liquid crystal display, a plasma display, or a light-emitting diode display, among others.

The system 180 may further include a wireless access point 190 coupled to the master heuristic policy enforcement module 106 to provide policy enforcement services to a wireless network node 194. Services may include heuristic policy enforcement, as previously described.

Any of the components previously described can be implemented in a number of ways, including embodiments in software. Thus, the apparatus 100, 160; heuristic policy enforcement modules 106, 130; network firewall 110; network node 114; state machine database 118; network controller 122; packets 126, 154, 156, 158; network stack 128; operating system 134; re-direction state module 138; tunneling modules 142, 146; packet inspection module 150A, 150B; network 164; network interface 166; processor(s) 170; network server 172; system 180; display 188; wireless access point 190; and wireless network node 194 may all be characterized as "modules" herein.

The modules may include hardware circuitry, single or multi-processor circuits, memory circuits, software program modules and objects, firmware, and combinations thereof, as desired by the architect of apparatus 100, 160, and system 180 and as appropriate for particular implementations of various embodiments. Thus, the modules may be included in a system operation simulation package such as a software electrical signal simulation package, a power usage and distribution simulation package, a capacitance-inductance simulation package, a power/heat dissipation simulation package, a signal transmission-reception simulation package, or any combination of software and hardware used to simulate the operation of various potential embodiments. These simulations may be used to characterize or test the embodiments, for example.

It should also be understood that the apparatus and systems of various embodiments can be used in applications other than controlling a security state associated with a network node from a centralized network firewall. Thus, various embodiments of the invention are not to be so limited. The illustrations of apparatus 100, 160, and system 180 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
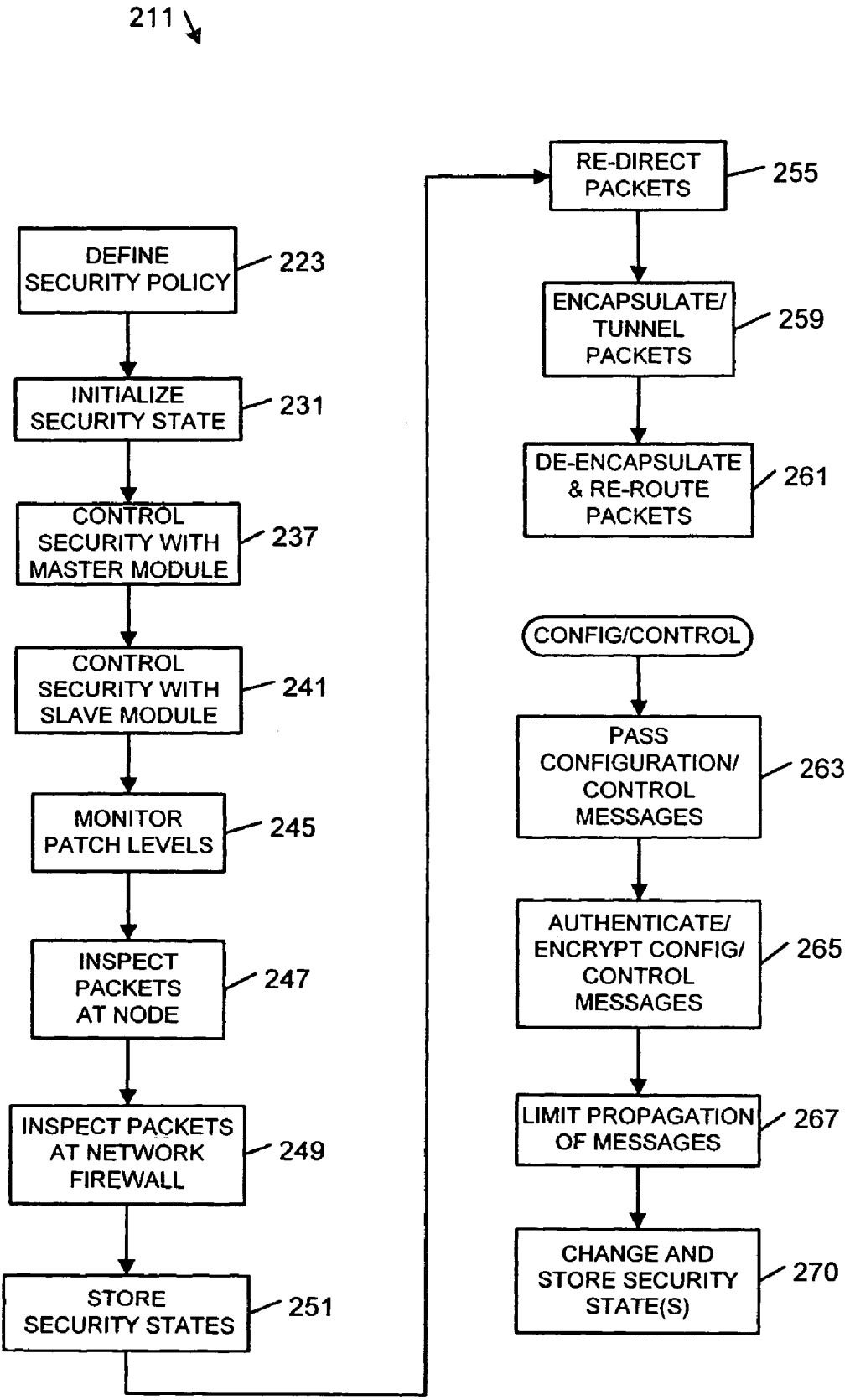
FIG. 2 is a flow diagram illustrating several methods according to various embodiments of the invention.

FIG. 2 is a flow diagram illustrating several methods according to various embodiments of the invention. One such method 211 may begin at block 223 with defining a security policy associated with a security state of one or more network node(s). The security policy may include a set of criteria used to select the security state, a set of actions to be taken at a time of transitioning to the security state, or both. The method 211 may continue with initializing the security state associated with the network node(s), perhaps to a state of insecure, at block 231.

The method 211 may also include controlling the security state associated with the network node(s) using a master heuristic policy enforcement module associated with a network firewall, at block 237. The method 211 may further include controlling the security state using a slave heuristic policy enforcement module coupled to the remotely manageable network controller, at block 241.

The method 211 may additionally include monitoring a software patch level associated with a network node operating system, a network node software application, or both to control the security state, at block 245. The method 211 may also include inspecting packets received at the network node(s), including packets received from one or more insecure nodes, using a packet inspection module coupled to the slave heuristic policy enforcement module, at block 247. The method 211 may continue at block 249 with inspecting packets received at the network firewall using a master packet inspection module coupled to the master heuristic policy enforcement module. The method 211 may further include storing the security state associated with the network node(s) in a state machine database coupled to the master heuristic policy enforcement module, at block 251.

The method 211 may continue at block 255 with selectively re-directing first packets to the network firewall from a remotely manageable network controller located within the network node(s) based upon the security state. The method 211 may also include encapsulating and tunneling the first packets between the network node(s) and the network firewall to effect the re-direction, at block 259. The method 211 may additionally include de-encapsulating and re-routing the first packets received from the network node(s), at block 261.

The method 211 may continue at block 263 with passing configuration and control messages between the network firewall and the network node(s). The method 211 may also include authenticating and encrypting the configuration and control messages using a transport layer security protocol, at block 265. The method 211 may further include limiting propagation of the configuration and control messages such that the messages do not traverse a network stack associated with the network node operating system, at block 267. The method 211 may conclude with changing and storing security state(s) associated with the network node(s), at block 270.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
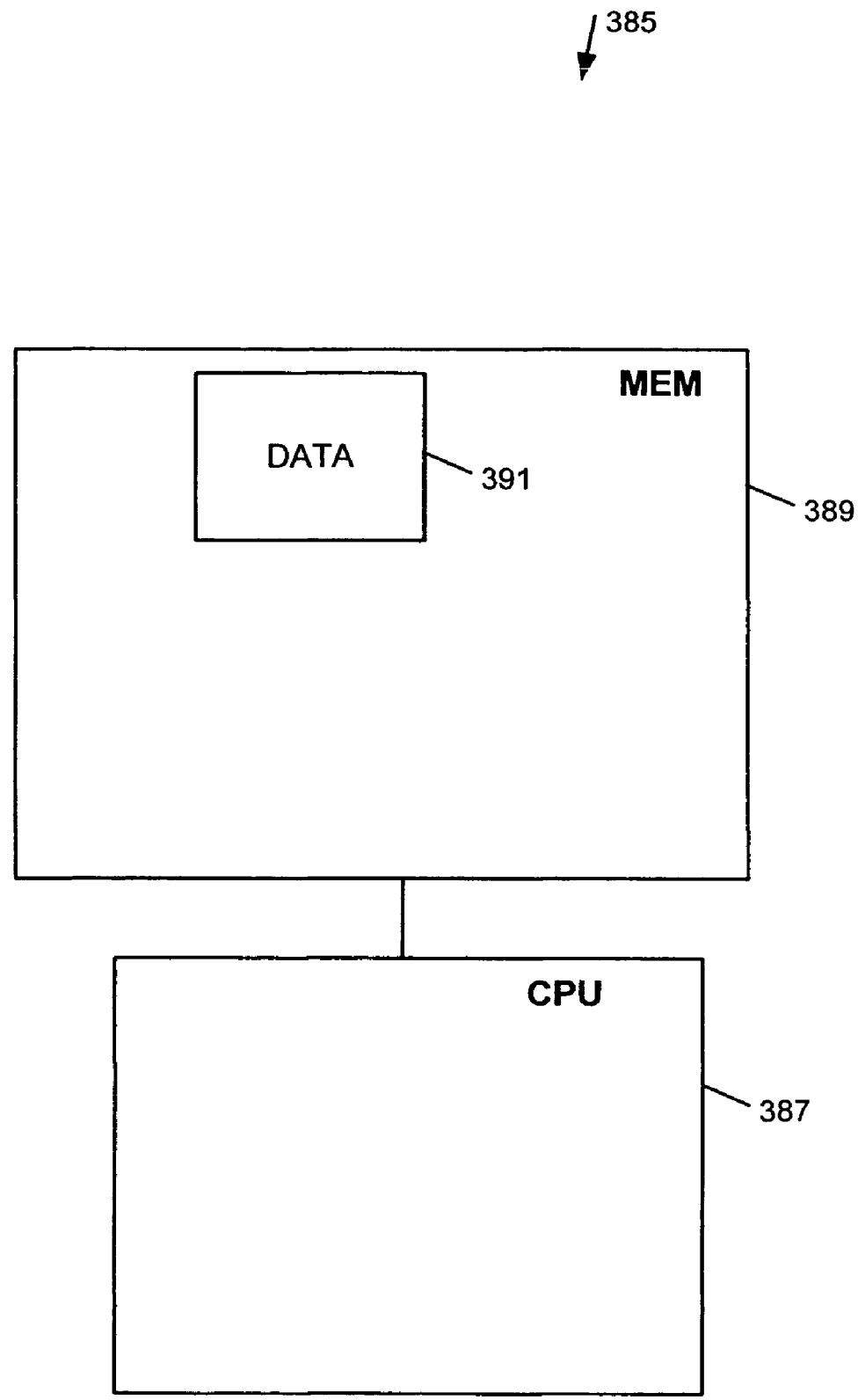
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) controlling a security state associated with one or more network node(s) using a master heuristic policy enforcement module associated with a network firewall, as previously described.

Other activities may include controlling the security state associated with the network node(s) using a slave heuristic policy enforcement module coupled to the remotely manageable network controller. Additional activities may include defining a security policy associated with the security state. The security policy may include a set of criteria used to select the security state, a set of actions to be taken at a time of transitioning to the security state, or both. Further activities may include selectively re-directing first packets to the network firewall from a remotely manageable network controller located within the network node(s) based upon the security state.

Implementing the apparatus, systems, and methods disclosed herein may operate to control a security state associated with a network node from a centralized network firewall, and to re-direct packets from the network node to the centralized network firewall for inspection.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
   a master heuristic policy enforcement module associated with a network firewall to control a security state associated with at least one network node;
   a state machine database coupled to the master heuristic policy enforcement module to store the security state associated with the at least one network node;
   a remotely manageable network controller located within the at least one network node to communicatively couple to the master heuristic policy enforcement module to selectively re-direct first packets to the network firewall, wherein the remotely manageable network controller is capable of re-directing the first packets without intervention by a network stack associated with an operating system executing on the at least one network node, wherein the remotely manageable network controller comprises a hardware module;
   a slave heuristic policy enforcement module coupled to the remotely manageable network controller to control the security state associated with the at least one network node;
   a re-direction state module associated with the remotely manageable network controller to enable the re-direction; and
   a slave tunneling module coupled to the re-direction state module to encapsulate the first packets for re-direction to the network firewall.

2. The apparatus of claim 1, wherein a decision to re-direct the first packets is made by at least one of the master heuristic policy enforcement module and the slave heuristic policy enforcement module.

3. The apparatus of claim 1, further including:
   a master tunneling module coupled to the master heuristic policy enforcement module to de-encapsulate and re-route the first packets received from the at least one network node.

4. The apparatus of claim 1, further including:
   a packet inspection module coupled to the master heuristic policy enforcement module to inspect the first packets received from the at least one network node and to inspect second packets to be forwarded to the at least one network nod.

5. An apparatus, including:
   an active network controller attached between a network and at least one network node, the active network controller operable for controlling a network interface having a re-routing function, wherein a policy-based security management function controls and supervises the re-routing function, wherein the active network controller comprises a hardware module;
   a host at the at least one network node, the at least one network node running an operating system, an application patch function, a configuration monitoring function, and a local firewall function;
   a centralized network server connected to the network and running a centralized firewall operable to enforce security, including encapsulating and re-routing packets between the server and the at least one network node and maintaining a state machine for each one of the at least one network node;
   a slave tunneling module to couple to the centralized network server to encapsulate the packets for re-routing to the centralized network server; and
   a re-direction state module coupled to the slave tunneling module to enable the re-routing function, wherein the active network controller is capable of re-routing the packets without intervention by a network stack of the operating system executing on the host of the at least one network node.

6. A system, including:
a master heuristic policy enforcement module associated with a network firewall to control a security state associated with at least one network node;
a state machine database coupled to the master heuristic policy enforcement module to store the security state associated with the at least one network node;
a remotely manageable network controller located within the at least one network node to communicatively couple to the master heuristic policy enforcement module to selectively re-direct first packets to the network firewall, wherein the remotely manageable network controller is capable of re-directing the first packets without intervention by a network stack associated with an operating system executing on the at least one network node, wherein the remotely manageable network controller comprises a hardware module;
a slave heuristic policy enforcement module coupled to the remotely manageable network controller to control the security state associated with the at least one network node; and
a slave tunneling module included within the remotely manageable network controller and coupled to the network firewall to encapsulate the first packets for re-routing to the network firewall.

7. The system of claim 6, further including:
a wireless access point coupled to the master heuristic policy enforcement module to provide heuristic policy enforcement services to a wireless network node.

8. The system of claim 6, wherein the security state associated with the at least one network node comprises at least one of secure and insecure.

9. The system of claim 8, wherein the security state of insecure requires the re-direction of the first packets to the network firewall.

10. The system of claim 6, wherein the master heuristic policy enforcement module changes the security state from secure to insecure to randomly inspect the first packets.

11. A method, including:
controlling a security state associated with at least one network node using a master heuristic policy enforcement module associated with a network firewall remotely coupled to the at least one network node over a network;
selectively re-directing first packets to the network firewall from a remotely manageable network controller located within the at least one network node based upon the security state;
controlling the security state associated with the at least one network node using a slave heuristic policy enforcement module coupled to the remotely manageable network controller;
encapsulating and tunneling the first packets between the network node and the network firewall to effect the re-direction;
passing configuration and control messages between the network firewall and the at least one network node; and
limiting propagation of the configuration and control messages such that the messages do not traverse a network stack associated with the network node operating system.

12. The method of claim 11, further including:
initializing the security state associated with the at least one network node to a state of insecure.

13. The method of claim 11, further including:
inspecting packets received from at least one insecure node using a packet inspection module coupled to the slave heuristic policy enforcement module.

14. The method of claim 11, further including:
storing the security state associated with the at least one network node in a state machine database coupled to the master heuristic policy enforcement module.

15. The method of claim 11, further including:
de-encapsulating and re-routing the first packets received from the at least one network node.

16. The method of claim 11, further including:
monitoring a software patch level associated with at least one of a network node operating system and a network node software application to control the security state.

17. The method of claim 16, further including:
authenticating and encrypting the configuration and control messages using a transport layer security protocol.

* * * * *